Nov. 14, 1967    E. COHN ET AL    3,352,009
PROCESS OF PRODUCING HIGH TEMPERATURE RESISTANT INSULATED
WIRE, SUCH WIRE AND COILS MADE THEREFROM
Filed Dec. 5, 1962    2 Sheets-Sheet 1
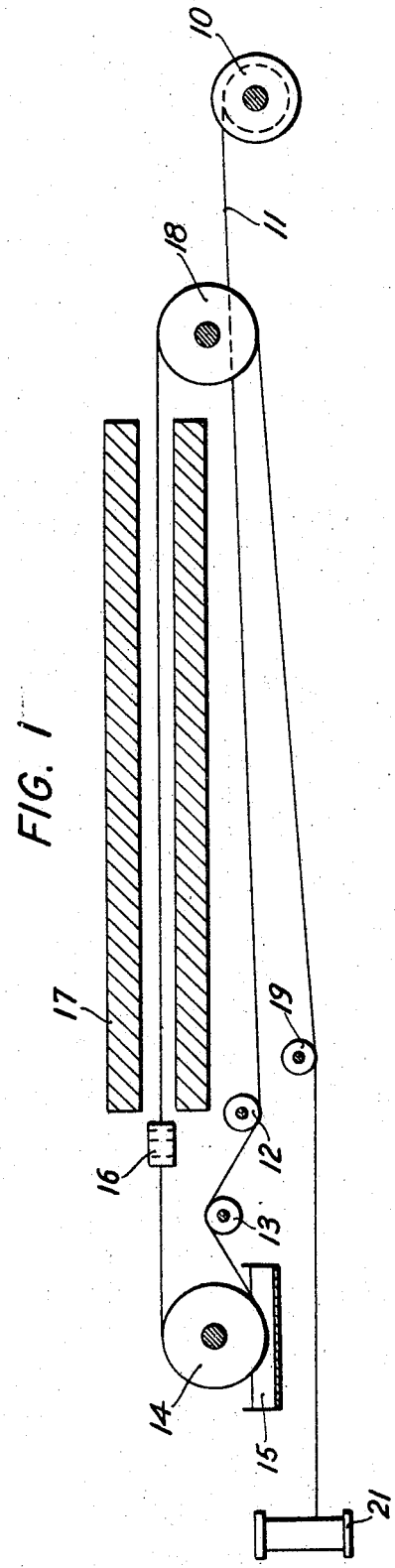
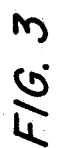
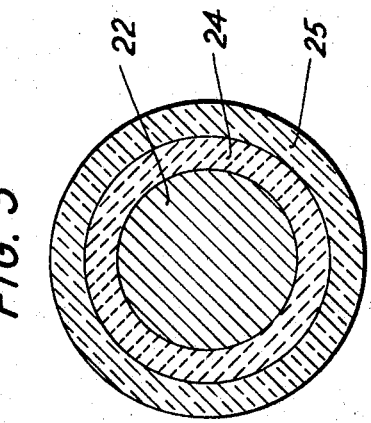
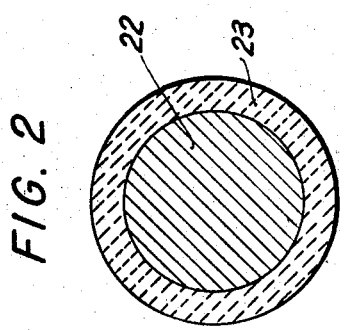
INVENTORS
EUGENE COHN
RAYMOND A. DeForest
RALPH GOTTLOB FRICK
BY
*Benjamin Swedler*
ATTORNEYS 3,352,009
PROCESS OF PRODUCING HIGH TEMPERATURE
RESISTANT INSULATED WIRE, SUCH WIRE
AND COILS MADE THEREFROM
Eugene Cohn, Larchmont, Raymond A. De Forest, New
City, and Ralph G. Frick, Nanuet, N.Y., assignors to
Secon Metals Corporation, White Plains, N.Y., a corporation of New York
Filed Dec. 5, 1962, Ser. No. 243,207
5 Claims. (Cl. 29—605)

This invention relates to the electrical insulation of wire, including fine wire, for example from .08 inch to .0004 inch in diameter, to produce flexible insulated wire which can be wound and unwound without cracking the insulation and when rewound to form the desired products such as resistors and other coils and windings and thereafter heated to the recommended curing temperature results in products having wire windings effectively insulated by the high temperature resistant electrical insulation thereon. The electrical insulation thus produced retains its insulating properties at temperatures above 600° F. and as high as 1200° F. and even higher.

This application is a continuation-in-part of application Ser. No. 741,190 filed June 10, 1958, and now abandoned. The invention includes our novel methods of making flexible insulated wire, our novel flexible insulated wire as a new product, and our novel resistors, in coil form, and other coils and windings.

In this specification, the expression coil is used in a broad sense and includes all windings whether cylindrical, elliptical or of other shape.

The flexible insulated wire of the present invention when wrapped around a mandrel having a diameter equal to ten times the outside diameter of the insulated wire, will show no cracks in the insulation; thus it meets existing specifications for flexibility of the insulation layer.

Ceramic coated wires are, of course, well known. Ceramic insulation, as heretofore produced on fine wires, is too brittle to permit winding the wire without cracking the insulation. This probably explains why the known ceramic insulated wires have found no commercial application in fields requiring high temperature resistant insulated wire, in which fields of use, the wire is wound to form potentiometers, other resistors and coils.

In this specification, the expression "ceramic material" is used as a generic expression to include refractory material, glass frits, mixtures of refractory material and glass frit and the fused coatings produced therefrom. The expression "refractory material" is used herein to mean, the minerals including metal oxides and metal salts as well as combinations thereof in the form of spinels, clays, etc., examples of which are given in this specification, crystalline in structure and having a melting point above 2500° F. The melting point of a refractory material is at least about 500° F. above the softening point of glass frit. Refractory materials are good electrical insulators at temperatures below 2000° F., i.e., they are substantially non-conductive of electricity at temperatures below 2000° F.

The expression "glass frit" is used herein in its technical sense to mean mixtures of silica ($SiO_2$) with metal oxides including alkali metal and/or alkaline earth metal oxides which are supercooled liquids, which mixtures do not have sharp melting points and soften within the range of 700° F. to 1900° F.; the particular softening point of a particular glass frit within this range depends on the chemical composition of its constituents.

It is an important object of this invention to produce insulated wire having a coating of ceramic material thereon which coated wire is flexible as produced, meeting the above test for flexibility, can be wound into coils without cracking of the ceramic coating and which wire, after being wound and given a final cure is effectively insulated by the high temperature resistant ceramic coating.

Still another object of this invention is to provide coils of wire suitable for use as resistors and other products, in which the insulation of contiguous convolutions are fused together, locking the conductors in place in a monolithic ceramic matrix resistant to high temperatures.

A further object of this invention is to provide a novel process for producing such ceramic coated wire.

Other objects and advantages of this invention will be apparent from the following detailed description thereof.

In accordance with this invention, the ceramic coating produced on the wire, as hereinafter described contains finely divided refractory material, glass frit and an organic binder imparting flexibility to the ceramic coating which is produced by the bonding of the refractory material and glass frit to the wire by the organic binder when the coated wire is heated to a temperature to effect such bonding. This coating of refractory material and glass frit can be applied in one or more steps. A slurry containing refractory material, organic binder and an organic solvent for the binder can be applied first and the thus coated wire heated to effect the bonding of the refractory material by driving off the solvent and polymerization or setting the organic binder, some of which is driven off, leaving enough organic binder in the ceramic coating to impart flexibility to the coated wire. Thereafter a slurry containing glass frit, organic binder and an organic solvent for the binder can be applied and the thus coated wire again heated to bond the glass layer to the underlying refractory layer leaving enough organic binder in both ceramic layers to produce flexible insulated wire which wire can be wound and unwound without cracking the ceramic insulation.

Alternatively, the slurry applied to the wire can contain both the refractory material and the glass frit as well as the organic binder and organic solvent for the latter so that the refractory material and glass frit along with the organic binder are coated simultaneously on the wire and the coated wire is heated to bond the mixture of refractory material and glass frit to the wire, the ceramic coating thus produced containing the residual organic binder uniformly distributed therethroughout in amount to render the coating flexible, i.e., so that the ceramic coating will not crack when the wire is wound and unwound.

The resultant wire can be shipped in spool form to the resistor manufacturer or to other users. After the resultant wire is wound as a coil to produce a resistor or other coil product, the wound coil is subjected to a final cure which removes substantially all the residual organic binder from the insulation producing a high temperature resistant insulated product in which, in the case of a coil, the insulating layers are fused together in a monolithic ceramic matrix. In all cases, the flexible insulated wire before use is subjected to a final cure to remove substantially all residual organic binder, at least the carbonaceous content thereof and produce ceramic insulation resistant to high temperatures.

In accordance with a preferred embodiment of this invention, the wire is first coated with a slurry containing finely ground refractory material, organic binder and organic solvent for the binder. One or more such coatings may be applied to build up on the wire the refractory material layer to the desired thickness, each layer being subjected to a partial cure, i.e., heated as hereinafter more fully disclosed, before application of the next layer. Thereafter a slurry containing finely ground glass frit, organic binder and organic solvent for the binder is applied and partially cured. One or more such partially cured glass frit layers can be applied, depending on the desired thickness of the ceramic insulation. The resultant partially cured ceramically insulated wire is wound onto spools and these spools are stocked and shipped by the wire manufacturer to the resistor manufacturer or other consumer. The latter unwinds these spools, winds the flexible ceramically coated wire to produce the desired resistors, coils or other products and subjects these products to heating to effect the final cure, as hereinafter more fully disclosed.

Before winding the ceramically coated wire, an overlay of conventional enamel (e.g., resin or silicone) may be applied to reduce the abrasiveness of the ceramic coating on the wire. This overlay burns off during the final curing step.

During the final curing step, fluxing of the refractory material with the glass frit takes place producing an insulation layer having good high temperature electrical insulation properties, e.g., resists voltage breakdown and retains its insulation resistance.

Of course, the insulated wire manufacturer, when his operations include the manufacture of the coils, can wind the partially cured flexible wire having a ceramic coating and subject the resultant product to the final curing treatment. It is quite common, however, to separate the production of the coated wire from its use in making coils and other products. Frequently, these two operations are conducted in separate plants and it is not unusual to have them carried out by separate entities. The present invention provides a technique for manufacturers of insulated wire to produce flexible ceramic coated wire, which can be wound and unwound without cracking the ceramic coating and hence can be wound on spools and stored as such for shipment as required. The recipient after winding the wire to produce resistors or other coiled products, subjects the wound products to the final cure to fully develop the desired high temperature resistance in the ceramic insulation.

Surprisingly, the partially cured ceramically insulated wire embodying this invention has no tendency for the wire to adhere to the spool, can be wound and unwound without cracking of the ceramic coating taking place, and can be handled in existing winding equipment to produce precision products with no difficulty. Upon subjecting the wound products to the final curing treatment, the ceramic insulation, i.e., the refractory material fuses into the glass, and the glass layers fuse together wherever a glass layer is in contact or near contact with a glass layer on adjacent wire. In the finally cured condition, the ceramic insulation is no longer flexible; the wire having been wound in place, the flexible properties of the insulation are no longer required.

As the wire which may be insulated in accordance with the present invention, any conductor of electricity including, for example, silver, silver alloys, nickel, Nichrome, platinum alloys, etc., may be used. In the case of bare silver and silver alloys, the final curing temperature should not exceed about 1500° F. In the case of nickel, it should not exceed about 1700° F.; nickel chromium alloys not above about 2000° F.; and platinum alloys not above about 2500° F.

The refractory material employed in producing the insulation may be alumina, barium titanate, barium zirconate, beryllium oxide, calcium titanate, calcium zirconate, mica, lead titanate, lead zirconate, lithium titanate, lithium zirconate, manganese oxide, strontium titanate, strontium zirconate, titanium dioxide, zinc oxide, zirconia, bentonite, montmorillonite, beryl, calcium oxide, chromium oxide, clay (ball, kaolin, sagger, slip, etc.), clinochlore, cobalt oxide, cobalt chromate, colemanite, diatomaceous earth, cordierite or mixtures of these constituents in any desired proportions. These refractory materials are generally admixed with a fluxing agent such as lithium borosilicate, lithium carbonate, lithium silicate, the glass frits hereinbelow described, or other suitable fluxing agents.

The glass frits employed may be any of the commercially available glass frits, such, for example, as those available under the trade names of Pemco Pb 83, Pb 723, Pb 63 or other glass frits. The compositions of these Pemco frits are given in the table which follows: in this table the relative amounts of the constituents are given on a weight basis.

PEMCO Pb 83

$Na_2O$ _____ .28
$PbO$ _____ .72
$B_2O_3$ _____ .56
$SiO_2$ _____ .90

PEMCO Pb 723

$Na_2O$ _____ .07
$PbO$ _____ .93
$Al_2O_3$ _____ .07
$SiO_2$ _____ 1.21

PEMCO Pb 63

$Na_2O$ _____ .21
$CaO$ _____ .29
$PbO$ _____ .50
$Al_2O_3$ _____ .12
$B_2O_3$ _____ .66
$SiO_2$ _____ 2.60
$ZrO_2$ _____ .07

The above three frits have relatively low softening points, i.e., from 1050° F. to 1450° F. Higher softening point frits which may be used are:

PEMCO P-786

$K_2O$ _____ .09
$Na_2O$ _____ .09
$CaO$ _____ .58
$SrO$ _____ .24
$Al_2O_3$ _____ .19
$B_2O_3$ _____ .36
$SiO_2$ _____ 2.80

Softening point about 1800° F.

PEMCO P-1409

$CaO$ _____ .13
$MgO$ _____ .87
$Al_2O_3$ _____ .48
$B_2O_3$ _____ 1.41
$SiO_2$ _____ 2.48

Softening point 1975° F.

In all cases, the refractory material and the glass frit are employed in a finely powdered condition. The particle size should be such that when the particles are suspended in the vehicle by agitation, a uniform suspension results.

Preferably when the slurry of organic binder, solvent, glass frit and/or refractory material is formed, it is tested to insure the production of a uniform homogeneous suspension. This test may involve dipping a clean glass slide in the slurry and examining it under the microscope. If large flocks of suspended particles are observed, the slurry should be milled until no large flocks form. By large flocks is meant particles of a size of the order of thirty microns or more. The desired finely ground material can be produced by milling in a ball mill the refractory material or glass frit as purchased, usually of an average size of from .5 to 10 microns, with the organic binder and solvent for a considerable period of time, usually about two hours, until a uniform homogeneous suspension results.

As the organic binder, resins or organic polymeric materials should be used which when heated to the initial curing temperature hereinafter disclosed, volatilize, decompose or polymerize to form a solid binder which bonds the ceramic material to the wire or to the underlying ceramic layer to which it is applied and when heated to final curing temperature substantially all of the carbon or carbonaceous material introduced into the ceramic layer by the binder goes off. Hence in the completed or finally cured product, substantially no carbon or carbonaceous deposits remain in the ceramic insulation. We have found that carbon or carbonaceous deposits formed upon polymerization or decomposition of the organic binder, if left within the ceramic coating in the cured state impairs the insulating properties of the ceramic coating. Residual inorganic constituents such as the halides or silica introduced with the organic binder, on the other hand, are not deleterious to the insulating properties of the ceramic coating. Evidently the inorganic constituents become part of the ceramic insulating coating and do not weaken or impair the insulation.

Examples of suitable organic binders, are the synthetic resins, such as the amine resins formed by condensation of urea or melamine with formaldehyde, alkyd resins, polytetrafluoroethylene, silicone resins, particularly the organosiloxane polymers employed as electrical insulating varnishes, including the alkyl siloxanes, the alkyl chlorosiloxanes, and the polyurethanes. The siloxanes are preferred because the carbon content thereof is readily removed during the final cure and the decomposition products do not impair the insulation properties of the ceramic coating containing same.

The solvent used can be any organic solvent such as toluene or xylene, which is readily driven off during the curing; most, if not all, of the solvent is removed during the initial cure. The solvent when the slurry is produced, effects the uniform distribution of the binder throughout the refractory material or glass frit or mixture of refractory material and glass frit, so that upon removal of the solvent the binder effectively bonds the refractory, or glass frit or both to the wire core or underlying ceramic layer, as the case may be.

The ratio of organic binder and solvent on the one hand, and glass frit, or refractory material or mixture of both, on the other hand, can vary depending chiefly on the desired thickness of the ceramic insulation applied per dip. In general the ratio should be 0.1 to 2 parts of organic binder, 0.2 to 3 parts of solvent per part by weight of the ceramic material, which as noted can be either refractory material, glass frit or a mixture of both. Preferred formulation for Al$_2$O$_3$ is 50% Al$_2$O$_3$, 10% to 20% resin solids, i.e., organic binder and 32 to 40% solvent (xylene). For glass frit slurries, preferred formulation is 35% glass frit solids, 25 to 40% resin solids and 25 to 40% solvent (xylene). For glass frit and Al$_2$O$_3$ refractory, preferred formulation is 40% of mixture containing equal parts of Al$_2$O$_3$ and glass frit, 10 to 25% resin solids and 35 to 50% solvent (xylene).

The suspension or slurry containing ceramic material, in organic binder and solvent is applied to the wire by dipping or wiping at any desired temperature below that at which substantial decomposition of the organic binder takes place. The suspension is constantly agitated during application to maintain it homogeneous, e.g., prevent settling.

Application to the wire at room temperatures gives good results.

The initial cure is carried out at a temperature of from 300° F. to 1,000° F., preferably 400° F. to 700° F. by passing the coated wire through an oven maintained at the desired temperature within this range. The time of cure will depend on the temperature and the wire diameter. Curing should be carried out to bond the insulation layer to the wire and leave within the insulation sufficient organic binder to produce a flexible insulation layer. Generally the partial cure will effect removal of substantially all of the solvent and a portion of the organic binder, leaving about 10 to 50% preferably about 10 to 20% of the amount of organic binder in the slurry applied to the wire, in the ceramic coating on the wire. At higher temperatures within the above range shorter curing times should be used, and at lower temperatures longer curing times. For example, operating near 1,000° F. in the case of .010 wire the curing time may be about two seconds. At temperatures near 300° F. in the case of .010 wire the curing time should be about 1 minute. Best results are obtained with wire diameters of .003 at about 650° F. with a curing time of three seconds, i.e., three seconds residence time within the curing oven.

In order to obtain the desired build up of insulation on the wire, generally, the wire is given two or more coatings of the suspension or slurry followed by a partial curing treatment after each application of the suspension or slurry. In practice three such applications of suspension followed by partial curing after each application resulted in an insulation layer .0015" thick.

The final cure is carried out at a temperature and for a time to effect substantially complete decomposition of the residual organic binder in the ceramic insulation so that substantially the entire carbon content of the organic binder is removed from the ceramic insulation. The temperature will depend on the ceramic material applied, the organic binder used and the metal of which the wire is constituted. Wires of silver and silver alloys having partially cured ceramic coatings should not be subjected to temperatures above about 1500° F.; when insulating such wire the lower melting point glass frits are used so that they will fuse at the curing termperature. Ceramic coated nickel wire should be cured at temperatures below 1700° F.; nickel chromium alloys at temperatures below 2000° F. and platinum alloy wire at temperatures below 2500° F.

The organic binder for the ceramic material should be chosen to take into account the metal wire to which the slurry of ceramic material, organic binder and solvent is applied and so that as noted above the carbon content of the organic binder is substantially completely removed when the wound insulated wire is subjected to the temperature conditions employed in effecting the final curing. In general, the final curing of the wound wire is carried out at a temperature within the range of 1050° F. to 2000° F. for about 10 minutes to two hours or longer. Shorter curing times should be used at higher temperatures and longer curing times at lower temperatures within these ranges. Obviously the temperature used should not be such as to deleteriously affect the bare wire; thus in the case of insulated nickel wire as noted, the final curing temperature should be below 1700° F.

In the accompanying drawings which show for purposes of exemplification, a preferred layout of equipment for practising the process of this invention and preferred embodiments of insulated wire embodying this invention, without limiting this invention to the illustrated embodiments:

FIG. 1 is a diagrammatic view showing one arrangement of equipment for insulating wire in accordance with the process of this invention;

FIG. 2 is a vertical section through an insulated wire in which the insulation is in the partially cured condition on a greatly enlarged scale;

FIG. 3 is a vertical section, on a greatly enlarged scale through a double coated insulated wire in which the insulation is in the partially cured condition, embodying the present invention;

Figure 4:
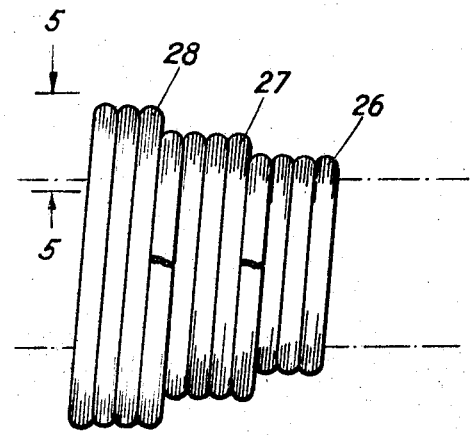
FIG. 4 is a diagrammatic view showing the insulated wire wound to form a plurality of convolutions.

Referring first to FIG. 1, 10 is the supply spool of bare (uninsulated) wire 11 which passes under a guide pulley 12, over a second guide pulley 13, around a guide roller 14 partially immersed in a suspension or slurry containing refractory material, with or without glass frit, organic binder and solvent for the latter, maintained in a state of constant agitation in tray 15. The coated wire then passes through a series of wipers or dies 16 and thence through the curing furnace 17. The partially cured insulated wire passes over another guide roller 18, under guide pulley 19, onto take-up spool 21 where it is wound. It will be understood that a plurality of wires may be passed through the equipment simultaneously in side by side relation, the pulleys and guide rollers being suitably grooved for this purpose and the desired number of dies 16 positioned in side by side relation. Also the insulated wire may be passed through the equipment any number of times depending on the buildup desired.

FIG. 2 shows a cross section through the resultant flexible insulated wire having an insulation layer consisting of a refractory material alone or a mixture of refractory material and glass frit, and residual organic binder which imparts flexibility to the insulation layer. In general, about 50 to 90% by weight of the organic binder and substantially all of the solvent is removed during the partial curing of the insulation layer, leaving therein from 10 to 50% organic binder of the total amount by weight of organic binder in the slurry applied to the wire. The residual organic binder aids in bonding the refractory material and glass frit when a mixture of the two is used, and the refractory material when a slurry containing the refractory material, organic binder and solvent is applied to the wire. The ceramic coating thus produced on the wire is flexible, the wire can be wound and unwound without cracking this ceramic coating.

When a slurry containing glass frit, organic binder and solvent for the latter is applied to an underlying layer of refractory material the residual organic binder present in the glass coating produced by the partial curing aids in bonding this glass coating to the underlined refractory material coating and results in a flexible ceramic coating consisting of the refractory first applied and an overlying glass coating.

In FIG. 2, 22 is the wire core and 23 the partially cured flexible ceramic insulation which as noted, may consist of refractory material, glass frit and organic binder simultaneously applied on successive layers of refractory material and glass frit each layer containing organic binder.

FIG. 3 shows a section through an insulated wire having two successive layers of insulation applied thereto. In this figure, 22 is the wire core, 24 a partially cured insulation layer consisting of refractory material, e.g., aluminum oxide and organic binder and 25 a partially cured insulation layer consisting of glass frit and organic binder. The latter bonds with layer 24 forming a fused glass surface in which the refractory material is embedded. The initial layer 24 of refractory material protects the wire 22, permitting the use of glass frit for layer 25 curable at higher temperatures than would otherwise be the case.

The glass frit layer 25, due to the glass frit fusing at a lower temperature than the refractory material, forms a fused glasslike layer in which the refractory material is embedded and aids in the formation of a strong bond between the ceramic insulation constituted of both the refractory material and glass frit and the wire. The glass frit thus has a dual function, it not only serves as part of the insulating layer but also aids in the attainment of a strong bond between the ceramic insulation constituted of the refractory material and glass frit and the wire. This is the case whether a mixture of refractory material and glass frit along with organic binder is applied to the wire or whether the refractory material and organic binder is first applied, and thereafter the glass frit and organic binder is applied in an overlaying layer. The simultaneous application of the mixture of refractory material and glass frit results in a glasslike coating containing uniformly distributed therethroughout the refractory particles which glasslike coating effectively insulates the wire under high temperature conditions. The successive application of the refractory material and glass frit results when the product is given its final cure in a ceramic insulation which has a smooth glasslike casing or sheath in which the refractory material is embedded and the outer surface of which is smoother than in the ceramic insulation produced by the simultaneous application of a mixture of glass frit, refractory material and organic binder to the wire.

Figure 5:
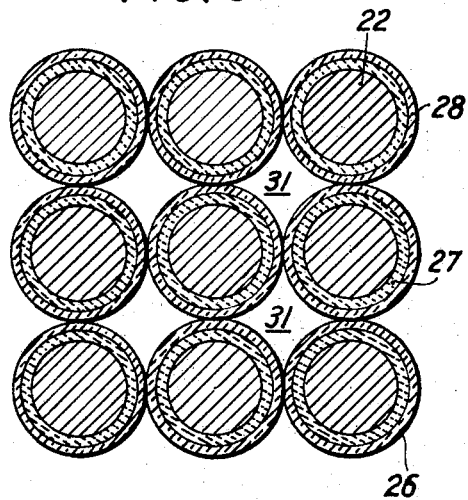
FIG. 5 is a vertical section through a portion of a coil showing the arrangement of the three convolutions of wire, as wound to form the coil, and prior to the final cure.

FIG. 4 shows the wire of FIG. 3 wound into coils having contacting helical convolutions 26, 27 and 28. FIG. 5 is a section taken through the portion of the coil located between the arrows 5—5 on FIG. 4, which section passes only through the upper portion of the coil. FIG. 5 is on a much larger scale than FIG. 4. Convolution 26 is the first or base convolution, 27 the intermediate convolution and 28 the top convolution. While three convolutions are shown, any desired number may be formed, depending on the product desired; the invention includes coils having a single layer of wound wire. The wire of FIG. 2 may be similarly wound into coils.

It will be noted from FIG. 5 that when the wire is wound, air spaces 31 are formed between contiguous convolutions. In other words, in the wound coil before it is subjected to final curing, air spaces 31 separate contacting convolutions of the insulated wire. The insulated wire in FIG. 5 is still flexible.

When the coil is subjected to the final cure, the layers of ceramic insulation fuse together forming a monolithic matrix 32 in which the wire is locked in place in desired spaced relation, the air spaces are thus eliminated. This matrix effectively insulates each conductor wire from an adjacent wire. Hence, with the present invention, it is not necessary to use any potting preparation to seal the coils. The coils are effectively sealed by the ceramic insulation.

Figure 6:
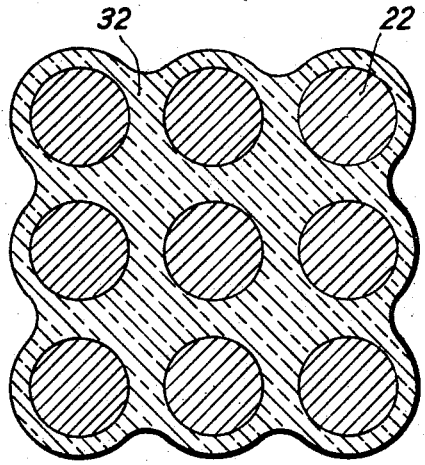
FIG. 6 is a vertical section through the same portion of the coil shown in FIG. 5, but after the final cure to which the coil is subjected.

In the cured condition, shown in FIG. 6, the insulation is no longer flexible. This, however, is of no moment, since the coil having been wound, flexibility is no longer a desideratum.

Protective coatings, e.g. against moisture penetration can be applied to the coils. Silicone lacquers, for example, will effectively protect the coils used at temperatures below 450° F. in moist or humid atmospheres.

Depending on the relative amounts of glass frit and refractory material employed in producing the layers 24 and 25, insulated wire will result having in the final cured product, from a porous outer shell to an outer shell which is vitreous and substantially water impervious. The latter resists and protects the wire against attack by common chemical reagents such as acids, alkali and organic solvents. In general the smaller the amount of glass frit relative to the refractory material the more porous the outer sheath, and the larger the amount of glass frit the more vitreous and glasslike the outer layer 25. By using more glass frit by weight than refractory material a vitreous outer glass shell results.

Figure 7:
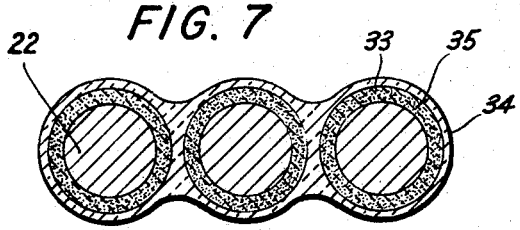
FIG. 7 is a vertical section through a portion of a coil in which the insulation has an outer vitreous sheath and an inner coating of refractory material.

In the embodiment shown in FIG. 7 refractory material is applied along with organic binder to produce the layer 33 of refractory particles. A layer of glass frit is then applied to form the ceramic layer 34; the coated wire is subjected after each application to partial curing and the wound wire coil subjected to final curing as herein disclosed. The resultant wire has a vitreous outer glass shell 34 encasing the inner refractory material layer 33, some of the glass of the glass frit passing through layer 33 and aiding in bonding the refractory material to the wire. Layer 33 consists however of a preponderating proportion of refractory particles indicated by reference character 35. These particles 35 tend to compensate for differential thermal expansion between the wire core and the outer insulating shell or matrix in which the wire is embedded.

The following examples are given for purposes of illustrating the invention. It will be understood the invention is not limited to these examples.

In these examples all parts, unless otherwise indicated, are on a weight basis.

Example I

¾ lb. of aluminum oxide was milled with 300 ml. of a heat reactive alkyd resin containing 40% solids and 350 ml. of a coal tar solvent for 2 hours. The resulting slurry was applied to 0.005 nickel wire and the coated wire passed through a furnace 32″ long. The furnace temperature was 625° F. and the rate of feed was 40 feet per minute. A second coating of a slurry containing 3 lbs. Pb 83 glass frit, 300 ml. of the heat reactive alkyd resin and 350 ml. of coal tar solvent milled as described in the first part of this example was applied over the first coating and the thus coated wire again passed through the furnace where it is heated to 625° F. for a residence time of about 3 seconds. The resulting wire met the above described flexibility test. The wire wound to form a coil was given a final cure at 1100° F. A hard vitreous coating resulted, capable of withstanding temperatures well above 1200° F.

Example II

This example differs from Example I in that the two slurries were mixed together in the ratio of 3 parts by volume of aluminum oxide, heat reactive alkyd resin and coal tar solvent to one part by volume of Pb 83 glass frit, heat reactive alkyd resin and coal tar solvent. All other conditions were the same as in Example I. The resulting insulated wire met the above described flexibility test. When wound into a coil and cured at 1050° F. the resulting insulation was hard and semi-vitreous, capable of withstanding temperatures well above 1200° F.

Example III

Equal parts of barium zirconate and calcium titanate were milled for 2 hours in the dry condition. 1 lb. of this mixture was milled with 300 ml. Dow Corning silicone enamel (1090) and 100 ml. toluene for 2 hours. The slurry was applied as in Example I with a furnace temperature of 590° F. and a rate of feed of 60 feet per minute. A second coating containing 2.5 lbs. Pb 83 glass frit, 300 ml. silicone enamel (Dow Corning 1090) and 100 ml. toluene was applied over the existing insulation in the same manner. The resulting wire met the above described flexibility test. When wound into a coil and given the final cure at 1350° F. a hard semi-vitreous insulation capable of withstanding temperatures well above 1200° F. resulted.

Example IV

In this example, a mixture of 5% flint, 20% kaolin, 12% ball clay, 43% refractory material consisting primarily of a mixture of aluminum oxide and silica and 20% Pb 545 glass frit was applied to the wire. The mixture was screened through a 325 mesh screen and then milled for 2 hours in the dry condition. The mixture was then milled with 250 ml. of a Dow Corning silicone enamel (No. 997) and 350 ml. of toluene for two hours. The resultant slurry was found to meet the glass slide test described above. The slurry was applied to .010 nickel chrome wire employing equipment of the type shown in FIGURE 1. The furnace (32 inches long) temperature was 700° F. and the rate of feed of the wire was 45 feet per minute. Thus the curing time was about 4 seconds. The wire produced met the above described flexibility test.

The wire was wound into a coil and given a final cure at 1700° F. The insulation thus produced was hard, semi-vitreous and capable of withstanding temperatures well above 1200° F.

Example V 1 part $Al_2O_3$, .5 to 10 micron grain size, was ball milled with 48 parts of silicone enamel (Dow Corning No. 997) and 24 parts of toluene. The ball milling was carried out at 60 r.p.m. for two hours. The slurry was tested by the above glass slide test under the microscope to ensure that no large flocks were present.

.003 nickel wire was passed through this slurry in equipment of the type shown in FIGURE 1. The furnace temperature (furnace 32 inches long) was 675° F. and the rate of feed of the wire was 45 feet per minute. Thus the curing time was about 4 seconds. The wire thus produced met the above described flexibility test.

The wire thus produced was given a second treatment employing a slurry containing

| | Parts |
|---|---|
| Pb 83 glass frit, composition given above | 3 |
| Silicone (Dow Corning #997) | 48 |
| Toluene | 24 |

This mixture was ball milled and applied to the insulated wire having a coating of aluminum oxide admixed with silicone enamel in the same manner as the aluminum oxide, silicone enamel coating, followed by heating in the furnace at a temperature of 675° F. When wound and unwound, the insulation showed no signs of cracking.

It will be understood that the insulated wire produced in Example V after being wound into coils would be given a final cure at a temperature below 1700° F.

It will be noted the present invention provides flexible insulated wire capable of withstanding relatively high temperatures above 600° F. and as high as 1800° F. in the case of the product of FIGURE 3 in which the layer 25 is of a high softening point frit. The flexible insulated wire, in which the organic binder is admixed with ceramic material, which may be either refractory material and glass frit applied successively or a mixture of both applied simultaneously, in the partially cured condition, is sufficiently flexible to permit winding the wire into coils to form potentiometers, other resistors and products. In the coil form, air spaces inherently result between adjacent convolutions of the wire as wound. However, when the coils are subjected to the final curing treatment, fluxing of the insulation takes place so that upon subsequent cooling, the convolutions of wire are maintained fixed in position by the monolithic matrix of ceramic material formed due to the flow of the ceramic coating into the aforesaid air spaces, filling same and subsequently hardening to form the monolithic matrix. Hence, with the present invention, potting of the coils is not necessary. In other words, the insulation is self-potting. The cured products are capable of withstanding high temperatures of the order of 1200° F. and higher without failure.

Since certain changes in carrying out the above process and certain modifications in the insulated wire, which embody the invention, can be made without departing from the scope of this invention, it is intended that all matter contained in the above description or shown in the accompanying drawings shall be interpreted as illustrative and not in a limiting sense.

What is claimed is:

1. The process of producing a coil of insulated wire which comprises coating the wire in unwound form with a slurry consisting essentially of refractory material in a silicone binder for imparting flexibility to the coating thus applied to the wire, heating the coated wire to a temperature within the range of 300° to 1000° F. to produce a coating on said wire containing from 10% to 50% of the silicone binder in the said slurry, thereafter coating the thus coated wire with a second slurry consisting essentially of glass frit and a silicone binder, and heating the thus coated wire to a temperature within the range of from 300° to 1000° F. to produce a glass frit coating containing from 10% to 50% of the binder in said second slurry and to bond said glass frit coating to the underlying coating of refractory material, thereby producing flexible insulated wire having a layer of refractory material on the wire and an overlying layer of glass frit bonded to the refractory layer, which wire can be wound and unwound without cracking the said insulation, winding the thus coated wire onto a storage spool in a partially cured condition, thereafter unwinding the coated coil from the spool and forming the wire into a coil, and heating the formed coil to a temperature of from 700° to 2000° F. to remove substantially all of the carbon content of the residual organic binder and fuse the refractory material and glass frit to produce upon cooling an insulated wound wire resistant to high temperature.

2. A process as claimed in claim 1 wherein the binder is employed in an amount of 0.1 to 2 parts by weight of said refractory material.

3. A process as claimed in claim 2 wherein the binder is employed with a solvent in the amount of 0.2 to 3 parts by weight of said refractory material.

4. A process as claimed in claim 1 wherein for each step in which the wire is heated to said range of from 300° to 1000° F., the duration of such heating is for about two seconds to one minute and the temperature and time within their respective ranges is in inverse relation to each other.

5. A flexible insulated wire comprising a wire core having a flexible insulating coating thereon consisting of a first layer containing particles of a refractory material and a silicone binder for said refractory material in an amount of 0.1 to 2 parts by weight of said refractory material to impart flexibility to said first layer so that it will not crack upon winding and unwinding of the wire and to bind said refractory material to said wire core, and a second layer bonded to said first layer consisting essentially of particles of glass frit and a silicone binder for said frit, said last mentioned binder being present in sufficient quantity to bind said second layer so that the double layer coated wire thus produced can be wound and unwound without cracking the coating layers.

References Cited
UNITED STATES PATENTS

| | | | |
|---|---|---|---|
| 2,350,822 | 6/1944 | Robinson | 336—205 |
| 2,421,652 | 6/1947 | Robinson et al. | 117—222 |
| 2,567,162 | 9/1951 | Sanders | 117—70 |
| 2,346,955 | 4/1944 | Wolfson et al. | 156—89 |
| 2,556,257 | 6/1951 | Denes | 156—89 |
| 2,105,166 | 1/1938 | Schwarzkopf | 117—215 |
| 3,110,619 | 11/1963 | Koenig et al. | 117—215 |

EARL M. BERGERT, *Primary Examiner.*

H. F. EPSTEIN, *Assistant Examiner.*